Oct. 1, 1963  F. C. USHER  3,105,493
SUTURE
Filed April 21, 1960

INVENTOR.
F. C. USHER
BY *Hudson and Young*
ATTORNEYS

United States Patent Office 3,105,493
Patented Oct. 1, 1963

3,105,493
SUTURE
Francis C. Usher, Houston, Tex., assignor to Phillips
Petroleum Company, a corporation of Delaware
Filed Apr. 21, 1960, Ser. No. 23,790
4 Claims. (Cl. 128—335.5)

This invention relates to an improved suture. In one aspect, it relates to a method and means for improving the knot retention capacity of a suture.

By virtue of their flexibility, high tensile strength, resistance to creep, inertness to living tissue, and ability to withstand hospital sterilization temperatures, solid, high-density polymers of ethylene would appear to be ideal materials for the manufacture of surgical sutures. However, the knot retention of sutures made from monofilaments of these materials has left room for improvement. Thus, sutures made from ethylene polymer monofilaments, the polymer having a density in the range hereinafter defined, have exhibited a relatively low capacity for retaining a knot. When the sutures are tied, as is customary in surgical practice, the knots have tended to slip and, in many cases, become completely untied. Improvement of the knot retention ability would increase the value of such materials for surgical suture manufacture.

An object of this invention is to produce an improved suture. Another object is to produce a suture having improved knot retention. Another object is to increase the knot retention of sutures made of high-density polymers of ethylene. Other objects and advantages will be apparent upon inspection of this disclosure.

I have now discovered that, by converting high-density ethylene polymer monofilament into a multifilament in which there are repeating transverse structural elements, the aforementioned drawback is eliminated, and a suture having excellent knot retention is obtained. The multifilamentary sutures of my invention can be manufactured from a multiplicity of monofilaments by a braiding procedure or from a single monofilament by a looping procedure, both of which are shown in the accompanying drawing.

Figure 1:
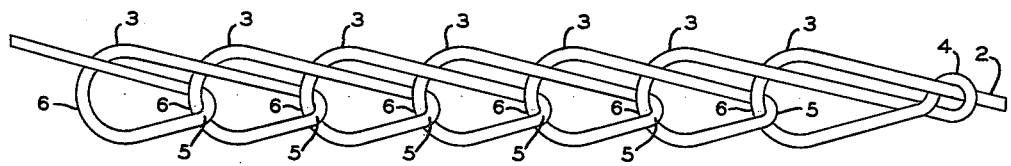

In the drawings FIGURE 1 shows a multifilamentary structure produced by a series of interlocked loops.

Figure 2:
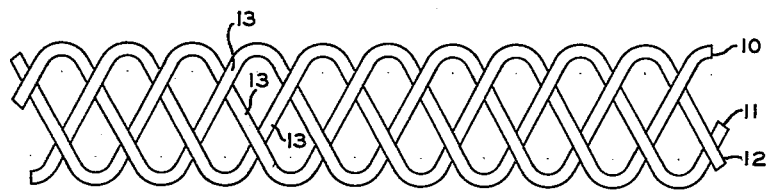

FIGURE 2 shows a braided multifilamentary structure.

The monofilament material used in the manufacture of the knot-retaining sutures of the present invention has a diameter in the range 0.5 to 10 mils. The finished knot-retaining suture has a denier in the range 1 to 4000 and a knot retaining strength (hereinafter defined) in the range 1 to 10 pounds. In many cases, the denier is in the range 200 to 800 and the knot retention strength in the range 1 to 5 pounds.

The ethylene polymers used in the manufacture of the sutures of the present invention are generally known as "high-density" or "low-pressure" ethylene polymers and have densities in the range 0.940 to 0.990 gm./cc., preferably 0.950 to 0.980, and preferably a melt index in the range 0.1 to 10. Methods for the preparation of such polymers are well known in the art. A preferred procedure for such manufacture is that of U.S. Patent 2,825,721 (1958). The polymer must be free of water-leachable impurities. Included within the scope of this invention are homopolymers of ethylene and copolymers of ethylene with minor amounts (e.g. 0.1 to 10 weight percent of the ethylene) of olefins such as propylene, 1-butene, and 1-pentene.

The monofilament used can be produced by melting the polymer and extruding the filament, which is then cold-drawn to from about 5 to about 20 or more times its original length at a temperature in the range between 100 and 250° F. If desired, the cold-drawn filament so prepared can be preshrunk by immersion in boiling water for several minutes.

As illustrated in FIGURE 1, one embodiment of the present invention is illustrated wherein a suture is prepared from a single monofilament but is, in essence, multifilamentary. Thus, as illustrated in FIGURE 1, a polyethylene monofilament 2 is formed into a loop as indicated at 6, the first loop being secured as indicated at 4 and brought forward and formed into a series of additional loops, each of which is interlocked into the preceding loop as indicated at 5. The loops 6 form transverse elements in the multifilamentary structure. The loops are illustrated as being loosely formed in FIGURE 1. After formation as shown, the loops are drawn tight so that a multifilamentary structure is obtained.

A multifilamentary braid suture is illustrated in FIGURE 2. As shown in FIGURE 2, three separate strands of polyethylene monofilament 10, 11, and 12 are braided to form a multifilamentary structure having transverse elements 13. In FIGURE 2, the braid is shown loose for purposes of illustration. The multifilament is, of course, drawn tight for use. Although the invention is illustrated as a multifilament having three strands, the invention is not limited to any particular number.

In the fabrication of the knot-retaining sutures of the invention, the braiding or looping procedure is effected, preferably by machine methods known in the art, the structure being drawn tight to provide a uniform repetition of the transverse elements. The resulting multifilament is then cut to the desired length and the ends sealed by a cautery or other heat sealing means, after which the segments are sterilized and sealed in sterile containers for use by the profession.

Several specific embodiments of my invention are described hereinafter. Braided sutures were prepared from a copolymer of ethylene and 1-butene. This copolymer had a density of 0.950 and a melt index of 0.3. It was prepared by copolymerizing a mixture of about 95 weight percent ethylene and about 5 weight percent 1-butene in the presence of a chromium oxide-silica-alumina catalyst having a total chromium content of approximately 2.5 weight percent, part of which was in the hexavalent state. The polymerization was conducted at 254° F.

Two types of sutures were prepared from 150 denier monofilament prepared from the copolymer as hereinbefore described. One of the types, illustrated by Examples 1–5, was braided from three strands of the monofilament. A second type (Examples 6–10) was braided from four strands of the monofilament. Results of tests of these sutures are shown in the following tabulation:

| Example No. | Break Strength, lb. | Denier | Tenacity, gm./denier | Lb. Pull Required to Slip Square Knot More than ½ inch |
|---|---|---|---|---|
| 1 | 5.8 | 420 | 6.3 | 1.2 |
| 2 | 5.8 | 410 | 6.4 | 1.1 |
| 3 | 5.9 | 420 | 6.3 | 1.3 |
| 4 | 5.6 | 420 | 6.1 | 1.1 |
| 5 | 5.6 | 425 | 6.0 | 1.3 |
| 6 | 7.0 | 600 | 5.3 | 2.0 |
| 7 | 6.2 | 610 | 4.6 | 2.0 |
| 8 | 5.6 | 615 | 4.4 | 2.1 |
| 9 | 6.5 | 625 | 4.2 | 2.3 |
| 10 | 5.4 | 655 | 3.8 | 2.7 |
| Monofilaments: | | | | |
| 6-mil | | 162 | 5.6 | 0.15 |
| 9-mil | | 298 | 7.9 | 0.18 |
| 12-mil | | 628 | 6.1 | 0.98 |

NOTES:
(a) Tests determined with Instron Machine per ASTM D-13 Standard Textile Test Methods, D-1380.
(b) Knot slip tests involve tying two ends of suture together with square knot to form a loop, snugging up, cutting loop, and pulling free ends in jaws of Instron machine. Gage length was 3 inches total with knot in the middle and crosshead speed 0.2 inch per minute. Strain rate 7% per minute.

For purposes of comparison, knot retention tests are shown for various sizes of monofilament prepared from the same ethylene copolymer used to prepare the braided sutures previously described.

The foregoing data show that the braided sutures in accordance with the present invention have improved knot strength and knot retention with respect to monofilaments prepared from the same material and of comparable diameter. The results also show favorable knot retention which compares favorably with other materials, such as silk and gut, which have been used to prepare sutures in accordance with the prior art. The sutures in accordance with my invention have the further advantage over these materials of being physiologically inert, having no tendency to produce unfavorable effects when used in connection with infected wounds.

The term "density" as used herein is determined by ASTM Method D1505–57T. The samples used for density determination are prepared by compression-molding molten pellets of the ethylene polymer to form a slab about 6 inches and 1/32 to 1/2 inch thick. A Pasadena press (Model P–325, Pasadena Hydraulics, Inc.) is used. The slabs are molded at 20,000 p.s.i. and 330° F. The heat is then turned off. Tap water is circulated through the mold cooling system. The slab is cooled to 200° F. at the rate of 25° F. per minute, and then to 150° F. as rapidly as possible by increasing the flow rate of the cooling water. The slab is then removed from the mold and allowed to stand for 24 hours at room temperature. Small pieces of the slab, e.g. about 1/4 inch squares, are cut off for the density determination. These pieces are examined to be sure that they have no surface pits or other features which might occlude or entrap air when immersed in liquid.

The term "melt index," as referred to herein, is determined by ASTM Method D1238–52T.

While numerous examples, process steps, structures and compositions have been specifically described herein for purposes of illustration, it will be clear to those skilled in the art that the invention is not limited to these and that reasonable variation and modificaton are possible within the scope of the disclosure and claims.

I claim:

1. A polyfilamentary surgical suture, from 1 to 4000 denier, having improved knot retention strength in the range 1 to 10 pounds, and composed of normally solid ethylene polymer having a density in the range 0.940 to 0.990, and said suture being essentially physiologically inert even in the presence of infection.

2. A polyfilamentary surgical suture having improved knot retention strength in the range 1 to 5 pounds and a denier in the range 200 to 800, said suture being composed of individual monofilamentary units each of which has a diameter in the range 1 to 10 mils and is composed of a normally solid polymer of ethylene, said polymer having a density in the range 0.940 to 0.990, and said suture being essentially physiologically inert even in the presence of infection.

3. A polyfilamentary 410 to 655 denier surgical suture having improved knot retention strength in the range 1.1 to 2.7 pounds and made of braided strands of ethylene polymer cold drawn monofilament having individual diameter in the range 1 to 10 mils, said polymer having a density in the range 0.950 to 0.980 and a melt index in the range 0.1 to 10, and said suture being essentially physiologically inert even in the presence of infection.

4. A polyfilamentary 200 to 800 denier surgical suture having improved knot retention strength in the range 1 to 5 pounds and made of a single ethylene polymer cold drawn monofilament having a diameter in the range of from 0.5 to 10 mils and formed into a chain of interlocking loops, said polymer having a density in the range 0.950 to 0.980, and said suture being essentially physiologically inert even in the presence of infection.

References Cited in the file of this patent

UNITED STATES PATENTS

| | | |
|---|---|---|
| 2,193,188 | Bradley | Mar. 12, 1940 |
| 2,671,444 | Pease | Mar. 9, 1954 |
| 2,825,721 | Hogan et al. | Mar. 4, 1958 |

OTHER REFERENCES

Usher et al.: "Hernia Repair with Marlex Mesh," Surgery volume 46, No. 4, Oct. 1959, pages 718–720 required. (Copy in Div. 55.)